United States Patent [19]

Lavarini

[11] 3,889,209

[45] June 10, 1975

[54] GASEOUS FLUX LASER OSCILLATOR

[75] Inventor: Bernard Lavarini, Paris, France

[73] Assignee: Compagnie Generale d'Electricite, Paris, France

[22] Filed: Aug. 27, 1974

[21] Appl. No.: 501,108

[30] Foreign Application Priority Data

Sept. 6, 1973 France .............................. 73.32156

[52] U.S. Cl. ............................ 331/94.5 G; 330/4.3
[51] Int. Cl. ............................................. H01s 3/22
[58] Field of Search...................... 331/94.5; 330/4.3

[56] References Cited
UNITED STATES PATENTS

| 3,447,098 | 5/1969 | Eckberg | 331/94.5 D |
| 3,575,669 | 4/1971 | Haeff | 331/94.5 |
| 3,628,181 | 12/1971 | Maitland | 331/94.5 |

OTHER PUBLICATIONS

Crocker et al., Electronics Letters, 6, (4), 20 Feb. 69, pp. 63–64.

Primary Examiner—Robert J. Webster
Attorney, Agent, or Firm—Sughrue, Rothwell, Mion, Zinn and Macpeak

[57] ABSTRACT

Gaseous flux laser oscillator of the type in which a gaseous mixture is excited axially within the optical resonant cavity by an electrical discharge. A hole drilled in one of the mirrors of the optical cavity enables both the exiting of the light beam produced and the inserting of the gas in the discharge tube in the form of a high-speed jet causing a swirling flow. Application to the increasing of the power of gaseous flux lasers.

5 Claims, 1 Drawing Figure

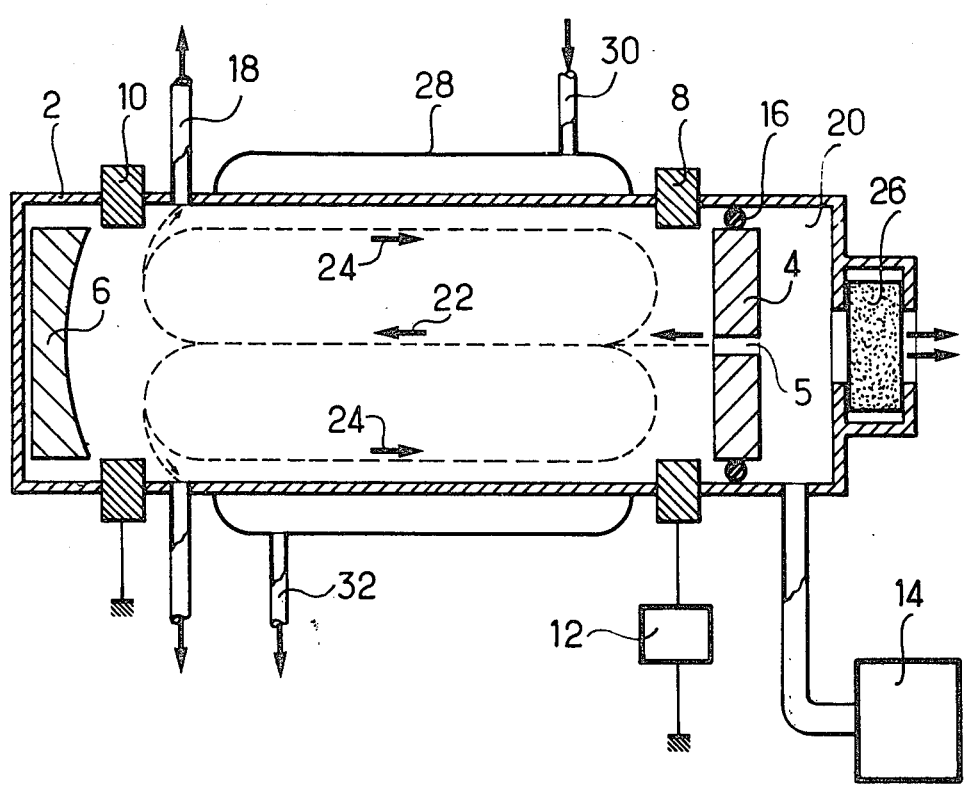

GASEOUS FLUX LASER OSCILLATOR

BACKGROUND OF THE INVENTION

1. Field of the Invention

The present invention concerns a gaseous flux laser generator of the type in which gas or a mixture of gas flows in an optical resonant cavity in which it is excited by an electric discharge.

2. Description of the Prior Art

A laser of that type is, for example, described in the periodical Applied Physic Letters, volume 15, No 3, of Aug. 1, 1969, "CW OPERATION OF HIGH PRESSURE FLOWING CO2 LASERS" by T. S. DEUTSCH, S. A. HORRIGAN and R. I. RUDKO. The gaseous mixture used in this example is composed of nitrogen, carbon dioxide and helium. The electrical discharge causes an increase in the temperature of the gaseous mixture which is detrimental to the proper operation of the laser. That is why cooling means are provided. These consist, on the one hand, of a flow of water round the walls of the discharge tube, on the other hand, a permanent supplying of a cool gaseous mixture and also a permanent extraction of the gaseous mixture heated up by the electrical discharge. These cooling means do not enable, however, powers as high as required to be obtained. Indeed, if it is required to increase the emitting power of a laser, circumstances lead to the increasing of the pressure of the gaseous mixture and of the power of the electrical discharge. If the cross-section of the discharge tube is not very small, the electrical discharge, which was homogenous at low powers, then becomes unstable and assume the form of a multitude of electric arcs in the shape of threads in which very high temperatures prevail. The operation of the generator then becomes impossible.

The present invention aims at producing a laser generator in which it is possible to keep an electrical discharge having increased power in a large volume of gas subjected to an increased pressure stable so as to obtain a particularly high light power.

SUMMARY OF THE INVENTION

The object of the present invention is a gaseous flux laser oscillator comprising :
- an elongated enclosure suitable for containing a gas capable of being excited by an electrical discharge so as to produce a laser effect ;
- first and second electrode arranged in the said enclosure and connected to a source of electric current so as to cause and maintain the said electrical discharge within the said gas ;
- a first and second mirror arranged in the vicinity of the first and second ends of the said enclosure respectively, so as to constitute an optical resonant cavity suitable for generating a laser oscillation within the said gas is excited by the said electrical discharge ;
- the said first mirror being arranged inside the said enclosure and drilled with a hole so as to enable a light beam resulting from the said laser oscillation to leave the said optical cavity ;
- the said enclosure being provided at its first end with a transparent port enabling the said light beam leaving the optical cavity to leave that enclosure also ;
- means being provided for inserting and extracting the said gas into and out of the said enclosure ;
- characterised in that the edges of the said mirror are connected together in a fluid-tight manner to the walls of the said enclosure so as to constitute an insertion chamber within that enclosure and comprising the said port ;
- the said insertion means comprising a source of the said gas to supply the said insertion chamber under pressure, so that this gas may enter the said optical cavity through the said hole drilled in the first mirror, forming a swirling flow in the space subjected to the said electrical discharge.

An embodiment of the present invention will be described hereinafter by way of a non-limiting example with reference to the single accompanying FIGURE.

BRIEF DESCRIPTION OF THE DRAWING

That single FIGURE is a cutaway view of a gaseous flux laser oscillator having a generally tubular shape showing a cross-section through a plane passing the axis of that oscillator.

DESCRIPTION OF THE PREFERRED EMBODIMENT

The oscillator according to the invention comprises an enclosure 2 made of glass of the Pyrex or electrically insulating type and having a generally tubular shape with a circular cross-section. A first mirror 4 and a second mirror 6 made of stainless steel or copper and forming together an optical resonant cavity of a known type are arranged respectively in the vicinity of the first and second ends of the enclosure 2. The mirror 4 is flat and it is drilled at its centre with a hole 5 having a diameter of 5mm. The mirror 6 is concave. The distance between these mirrors is about 280 mm. Their diameter is close to that of the enclosure 2, which is 40 mm.

With a view to enabling a swirling gaseous flow in the space comprised between these two mirrors, it appeared to be an advantage for the ratio between the distance separating the mirrors 4 and 6 to the diameter of the enclosure 2 to be between 5 and 8.

Two annular electrodes 8 and 10, in the vicinity, respectively, of the mirrors 4 and 6 are arranged inside the enclosure 2, around the optical cavity formed by the mirrors 4 and 6. These electrodes are made of copper and they are fed by means of a source 12 suitable for supplying a direct current voltage of 30 kV.

An orifice enabling the inserting of a gaseous mixture from source 14 is arranged in the vicinity of the first end of the enclosure 2 and beyond the mirror 4, that is, outside the optical cavity formed by the mirrors 4 and 6. That source is capable of supplying, under a pressure of 600 mbars, a mixture composed as follows:

| | | |
|---|---|---|
| Nitrogen | 47 % | |
| Carbon dioxyde | 6 % | approximately |
| Helium | 47 % | |

The edges of the mirror 4 are joined in a fluid-tight manner to the wall of the enclosure 2 by means of an elastic O-ring 16 so as to form, at the first end of the enclosure 2, a chamber 20 called, here, the "insertion chamber" and communicating on the one hand with the source of gas 14 and on the other hand with the remainder of the enclosure 2 through the hole 5. The gas coming from the source 14 cannot then reach the space comprised between the mirrors 4 and 6 except by passing through the hole 5. The enclosure 2 is provided, in the vicnity of the electrode 10, with six extraction orifices 18 communicating with a zone where the pressure is kept very low by means which are not shown. Each of these orifices has a cross-section of 60 squ. mm.

The number and cross-section of these orifices, having the same cross-section as the hole 5, the pressure of the gaseous mixture in the insertion chamber 20, the diameter of the enclosure 2 and the distance between the mirrors 4 and 6, are chosen so as to obtain the following results, available to the man in the art : on the one hand, the pressure prevailing in the space comprised between the mirrors 4 and 6 should have a suitable value, in the order of 200 mbars in the example described. On the other hand, that space should be taken up by a swirling flow such that in the vicinity of the axis of the enclosure 2, the gaseous flux moves in the direction from the mirror 4 towards the mirror 6, as shown by the arrow 22 and, in the vicinity of the walls of the enclosure 2, the gaseous flux flows in the direction from the mirror 6 towards the mirror 4, as shown by the arrows 24. In these conditions, the excitation of the gaseous mixture by the electrical discharge between the electrodes 8 and 10 causes, if the mirrors 4 and 6 are suitably adjusted to form a resonant cavity, the appearance of a laser oscillation and the output through the hole 5, of an infra-red light beam having a wavelength of 10.8 microns, these being characteristic of carbon dioxide. That light beam may leave the enclosure 2 through a port 26 transparent to that wavelength and constituted, for example, by sodium chloride.

Between the electrode 8 and the extraction orifices 18, the enclosure 2 is surrounded by a cooling sleeve 28 of the water flow type, provided with insertion orifices 30 and extraction orifices 32.

With a view to obtaining a swirling flow within the enclosure 2, and a stable high-power electrical discharge, enabling high efficiency of the laser oscillator and an output power which is also high, it is necessary to choose carefully the values of the parameters characterizing the oscillator. As these values may obviously be substantially different from those which have been shown hereinabove, a few indications will be given hereinafter so as to make the obtaining of the results shown hereinabove easier in various cases of application.

It is good for the quantity of movement $Q_m$ injected per second through the hole 5, that is, the product of the discharge in mass of gas by the speed of injection, to be comprised between one and 30, if the metre, the second and the kilogram are taken as units :

$$1 \text{ kg./m/S}^2 < Q_m < 30 \text{ kg.m/S}^2$$

The coefficient of permeability K at the output, that is, the ratio between the output surface of the orifices 18, and the surface of the cross-section of the enclosure 2, is, to great advantage, comprised between 5 percent and 50 percent.

$$5\% < K < 50\%$$

As for the pressure of the gas in the enclosure 1, the present invention is especially interesting if it is greater than 0.1 bar. It may reach several bars without any appearance of an electric arc.

The injection speed V of the gas through the hole 5 is preferably greater than 100 metres per second.

$$V > 100 \text{ m/s}$$

The current density j in the enclosure 2, that is, the ratio between the intensity and the surface of the cross-section of the enclosure must be increased if it is required to increase the power of the generator. High current densities may be obtained in enclosures having small cross-sections. A homogenous electrical discharge is then set up. But if it is required to increase the power of the generator by increasing the cross-section of the enclosure, electric arcs in the form of filaments appear. The present invention makes it possible when the current density is great to increase the cross-section of the enclosure 1. The result obtained is to great advantage : $10 \text{ mA/squ. cm} < j < 200 \text{ A/squ. cm}$.

The electric energy $W_m$ injected per unit of mass of gas may be expressed in joules per gramme :

$$500 \text{ J/g} < W_m < 5000 \text{ J/g}.$$

It may be an advantage to calculate the ratio E/N between the electronic field E in the enclosure 1 and the number N of molecules of gas per cubic centimetre, for that ratio is connected with the average speed of an electron striking a molecule of gas.

The result then obtained is preferably :

$$10^{-17} \text{ V/squ. cm.} < E/N < 10^{-14} \text{ V/squ. cm.}$$

The values of the parameters previously defined in two examples of embodiment of the invention, corresponding to a distance L between the mirrors 4 and 6 and to a diameter D of the enclosure 2, slightly different from what has been stated above, will be given herebelow.

| PARAMETER | UNIT | 1st example | 2nd example |
|---|---|---|---|
| L | mm | 300 | 300 |
| D | mm | 50 | 50 |
| $Q_m$ | Kgm/s$^2$ | 3.5 | 17.5 |
| K | % | 10 | 15 |
| P | millibar | 200 | 500 |
| V | m/s | 320 | 580 |
| j | A/squ.cm. | 20 | 60 |
| $W_m$ | J/g | 690 | 1.600 |

I claim:

1. In a gaseous flux laser oscillator comprising:

an elongated enclosure suitable for containing a gas capable of being excited by an electrical discharge so as to produce a population inversion therein;

first and second electrodes arranged in the said enclosure and connected to a source of electric current so as to cause and maintain the said electrical discharge within the said gas;

first and second mirrors arranged in the vicinity of the first and second ends of the said enclosure respectively, so as to constitute an optical resonant cavity suitable for generating a laser oscillation within the said gas when it is excited by the said electrical discharge;

said first mirror being arranged inside said enclosure and drilled with a hole so as to enable a light beam resulting from the said laser oscillation to leave the said optical cavity therethrough;

said enclosure being provided at its first end with a transparent port enabling said light beam leaving the optical cavity to leave that enclosure also;

means for inserting and extracting said gas into and out of said enclosure, the improvement wherein:

the edges of the said mirror are connected together in a fluid-tight manner to the walls of said enclosure so as to constitute an insertion chamber within that enclosure and comprising said port; and said insertion means comprises a source of said gas to supply gas to said insertion chamber under pressure, conduit means connecting the gas source and insertion chamber for admitting the gas to said optical cavity through said hole drilled in the first mirror, and for forming a swirling flow in the space subjected to the said electrical discharge.

2. The laser oscillator according to claim 1, in which said enclosure has the shape of a tube having a substantially circular cross-section, said hole drilled in the first mirror is arranged in the axis of that enclosure, the ratio between the distance separating the said first and second mirror to the diameter of the said enclosure is between 5 and 8.

3. The laser oscillator according to claim 2, in which said electrodes are respectively arranged around said optical resonant cavity, in the vicinity of each of said mirrors.

4. The laser oscillator according to claim 1, in which said first mirror is a plane mirror and said second mirror is a concave mirror.

5. The laser oscillator according to claim 1, in which said gas is a mixture of nitrogen, carbon dioxide and helium.

* * * * *